Aug. 23, 1955  H. ALLEN  2,716,016

PLUG VALVE

Filed March 30, 1950  2 Sheets-Sheet 1

Herbert Allen
INVENTOR.

BY Browning & Simms
Attorneys

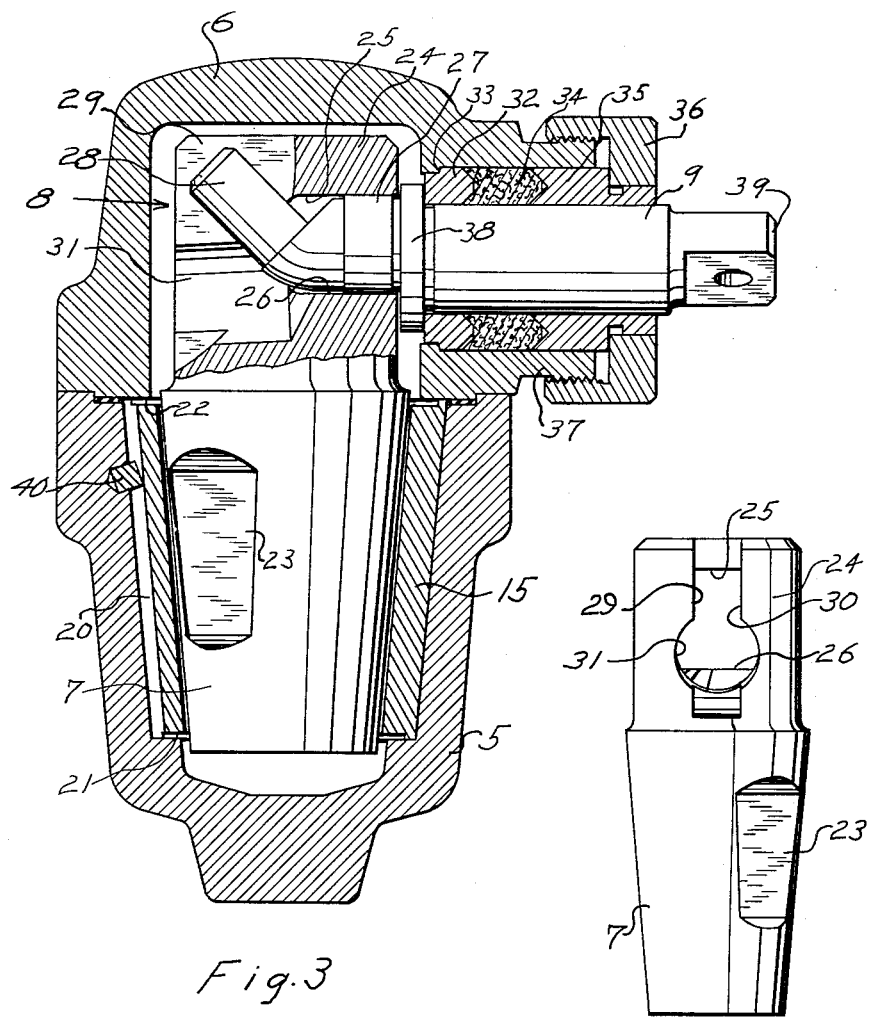

United States Patent Office 2,716,016
Patented Aug. 23, 1955

2,716,016

PLUG VALVE

Herbert Allen, Houston, Tex., assignor to Cameron Iron Works, Inc., Houston, Tex., a corporation of Texas Application March 30, 1950, Serial No. 152,911

14 Claims. (Cl. 251—163)

This invention relates to improvements in plug valves and refers more particularly to the type of plug valve in which to open or close the valve, the plug valve member is unseated, rotated and reseated.

This type of valve is illustrated in my co-pending applications for United States Letters Patent, filed December 3, 1949, Serial Number 130,972 (now Patent No. 2,684,596, July 27, 1954), and filed December 30, 1949, Serial Number 135,966.

In valves of this type, it has heretofore been necessary to mount the plug valve member on a valve stem extending exteriorly of the valve casing which is operably connected to a suitable actuator. In order to balance the effect of the forces tending to move the valve member due to the pressure controlled, the plug valve member has been mounted on a second stem extending from the valve casing in an opposite direction from the operational stem and of substantially the same diameter as that of the operational stem. This construction complicates the valve, adds to its weight, increases the likelihood of leakage of line fluid, and increases the cost of the finished product.

An object of this invention is to provide a simple and rugged valve of the class under consideration of few parts with resultant reduction in weight and cost.

Another object is to provide a plug valve of the character described in which the actuating shaft extends into the valve casing and the force transmitting connections between the shaft and plug valve member are all enclosed within the valve casing.

A further object is to provide a valve of the class described in which the plug valve member does not have any parts carried by it and exposed exteriorly of the valve casing.

Still another object is to provide a valve of the class described wherein the plug valve member and all parts carried by it are exposed to line pressure to balance out the effect of this pressure on it.

A still further object is to provide a valve of the class described which employs but a single stuffing box and yet wherein the effect of line pressure upon the plug valve member is balanced out.

Yet another object is to provide in a valve of the class described an actuating shaft which is held against accidental rotation by the line pressure.

Yet a further object is to provide a plug valve having an actuator including cam parts cooperable with cranks carried by a drive shaft in which the cam parts are integrally formed on the plug valve member.

Another object is to provide a valve of the class described wherein the necessity for providing bearings to maintain the plug valve member against movement other than along or about a fixed axis is eliminated.

Other and further objects of the invention will appear as the description proceeds.

In the accompanying drawings wherein like reference numerals are used to indicate like parts in the various views:

Fig. 3 is a view taken along the line 3—3 in Fig. 1 in the direction of the arrows; and Fig. 4 is an elevational view of the plug valve member and cam head showing the opposite side to that shown in Fig. 1.

The valve may be considered in general as comprising a casing made up of a body part 5 and bonnet 6 which houses a plug valve member 7 and actuating mechanism for the plug valve member, indicated generally at 8. The actuating stem 9 is a shaft having a sealed journal in the casing and is the only part which extends from the interior to the exterior of the casing.

Figure 2:
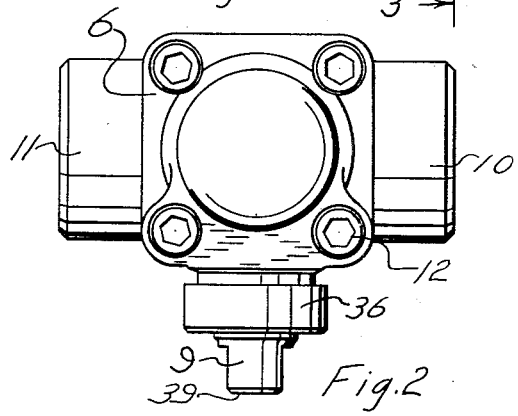
Fig. 2 is a top plan view, upon a reduced scale, of the valve shown in Fig. 1.

The casing is hollow and is provided with a flow passage therethrough including fittings 10 and 11, in the body, for connecting the valve in a conduit. The bonnet is secured to the body by a series of cap screws 12, shown in Fig. 2. Preferably, the joint between the body and bonnet is such as to provide a groove for receiving a gasket 13 of resilient flowable material.

In order to control the flow passage, a valve seat surface 14 is located transverse the passage and preferably is provided by a seat insert or liner 15 which is tapered. This liner has openings 16 and 17 which register with fittings 10 and 11. The openings and the fittings may have a seal thereabout as by O-rings 18 which may fit in grooves formed in the outer periphery of the seat insert and surrounding the openings 16 and 17.

The liner fits in the casing between a shoulder 19 formed in the body and the underside of bonnet 6. It is preferred to insure equalization of pressure above and below the plug valve member, and this may be accomplished by providing a passage communicating between the interior of the bonnet and the lower portion of the interior of the body. Where a seat insert is employed, this passage may include a longitudinal groove 20 in the outer periphery of liner 15 which communicates with counterbores 21 and 22 at the ends of the liner.

Plug valve member 7 has an outer peripheral surface which conforms to the seat 14 and has an opening 23 which is adapted in one position of the plug valve member to register with fittings 10 and 11 and openings 16 and 17 to complete the flow passage, and in another operational position to be transverse these fittings and openings so as to close the flow passage.

Plug valve 7 and cam head 24, which performs the functions of the usual valve stem, are completely enclosed, and the upper stuffing box and bearing about the valve stem as well as the counterbalancing lower shaft and bearing usually found in valves of this type are eliminated. Thus, the plug valve 7 may be said to be free floating in that it may move freely, within limits, in response to the pressure controlled when lifted from its seat. In valves of this type, it is only necessary to limit the endwise movement of the free floating plug to contain the lower end of the plug within the frusto-conical seat which acts as an aligning guide in the seating of the plug. In the illustrative embodiment, valve 7 is free to move laterally within the confines of liner 17 when lifted from its seat, and the endwise movement of valve 7 is limited only by the engagement of crank 27 with cam head 24.

The actuating mechanism shown generally at 8 is of the type that in operation will move the valve member from its seat, rotate it to a new operational position, and reseat it in the new position. This mechanism, except for the exterior of the actuating stem or shaft 9, resides within the valve casing and may be all formed on the plug valve member and the inner end of shaft 9. In the embodiment shown, the portion of the mechanism which is carried by the plug valve member includes a cam head 24 which is integrally formed with the plug valve member. This cam head has machined thereon follower or cam surfaces 25 and 26 adapted to follow a crank or eccentric 27 mounted on shaft 9. Upon rotation of the shaft, endwise movement will be imparted to the cam head and plug valve member due to this connection.

The connection means between the shaft and plug valve member also includes an angular crank 28, as a part of the crank means carried by shaft 9. This crank part cooperates with follower or cam surfaces 29 and 30 formed on the cam head. These cam surfaces are provided with a cutaway 31 so that they are engaged by the angular crank part 28 only during an intermediate portion of the rotation of shaft 9 which opens or closes the valve. Thus, initial turning of shaft 9 does not affect the rotative position of the plug valve member, but when the crank part 28 engages one of the cam surfaces 29 and 30, additional turning of the shaft will rotate the plug valve member to a new operational position, and when this new position is reached, the crank part 28 will have again disengaged with the surfaces 29 and 30 and come in register with the cutaway portion 31. Because of this arrangement, it is desirable that the crank parts 27 and 28 act out of phase so that initial and final movements of the plug valve member will be unseating and seating movement respectively and the intermittent movement will be rotative with some endwise movement.

The shaft 9 extends angularly relative to the rotational axis of the plug valve member and is journaled in the casing. The journal may be provided by a stuffing box secured in an opening in bonnet 6. This stuffing box comprises a bearing gland 32 held against a shoulder 33 formed in the bonnet opening, packing material 34 and bearing gland 35. Bearing gland 35 is secured in place by gland nut 36 threaded to a boss 37 formed on the bonnet and surrounding the stuffing box.

In operation where line pressures greater than atmospheric are controlled, the pressure within the valve casing will exert a thrust upon the shaft 9 tending to force it to the right as viewed in Fig. 3. To resist this, a thrust bearing is provided which may include an annular enlargement 38 with a shoulder abutting the inner edge face of gland bushing 32. The friction between the bearing member 38 and bushing 32, plus the friction due to the packing engaging the periphery of shaft 9, will retard rotation of shaft 9 sufficiently to prevent accidental rotation of the shaft. A suitable anti-friction bearing arrangement may be employed to take this thrust if extremely high line pressures make this desirable.

The shaft may have a wrench part 39 at its end for receiving a hand wheel, wrench or the like, and this wrench part 39 may serve as an indicator to indicate open or closed positions of the plug valve member. When the wrench part is in its Fig. 1 or vertical position, the plug valve member is in closed position. When the plug valve member is in the other operational position, the wrench part will have rotated through 270° and will extend horizontally and parallel to the flow passage, to indicate that the valve is open.

Where the operational positions of the plug valve member require rotation of the plug member through 90°, as in the embodiment shown in the drawings, shaft 9 preferably is at right angles to the rotational axis of the plug valve member and the crank part 28 extends at 45° to the rotational axis of shaft 9. The follower surfaces 25 and 26 are located in planes at right angles to the rotational axis of the plug valve member and surfaces 29 and 30 are in planes which parallel the rotational axis of the plug valve member.

Figure 1:
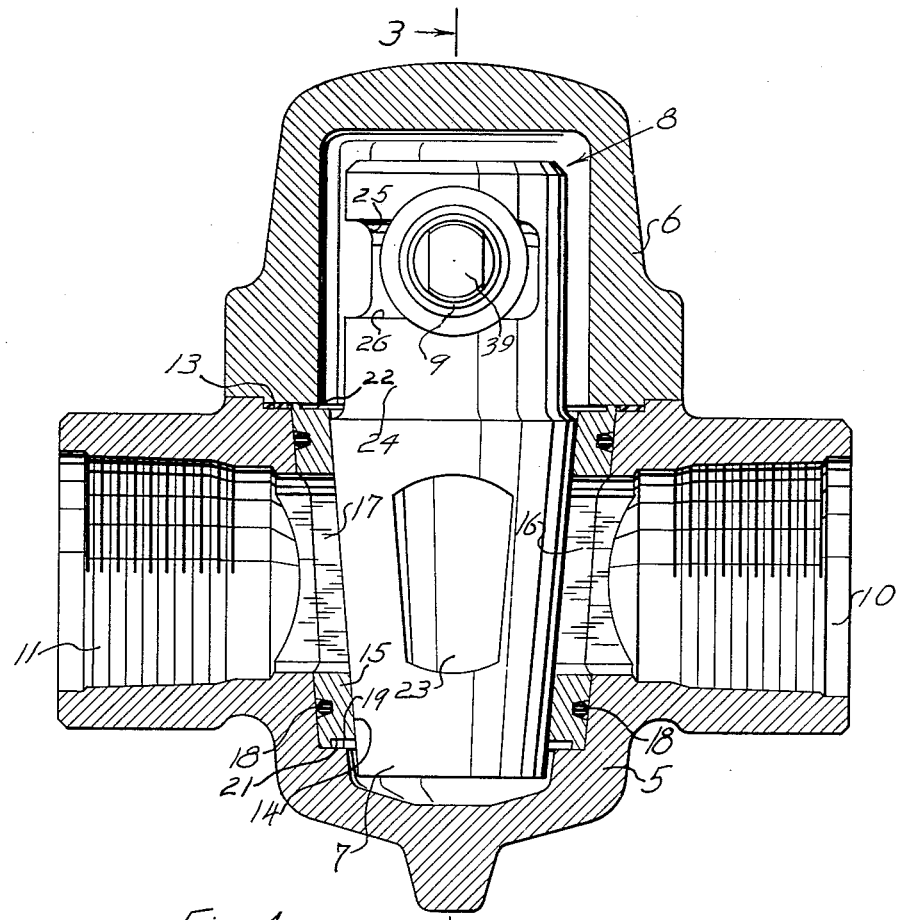
Fig. 1 is a vertical sectional view taken through the flow passage of a valve embodying this invention.

In operation, the shaft 9 is turned counterclockwise, as viewed in Fig. 1, in order to shift the plug valve member from the Fig. 1 closed position to the open position.

Reverse rotation of shaft 9 will shift the plug valve member from open to closed position. During the actual shifting of the plug valve member from one operational position to the other, initial movement of shaft 9, due to eccentric 27 abutting follower surface 25, will raise the plug valve member to an unseated position. During this initial turning movement of the shaft, the crank part 28 resides in the cutaway portion 31 of the cam surfaces with which it cooperates, and therefore, no turning of the plug valve member takes place. However, when the crank part 28 engages either cam surface 29 or cam surface 30, further rotation of the shaft will induce a rotative movement to the plug valve member. Then at the end of the opening or closing operation, the crank part 28 will again enter the cutaway portion 31 and further rotation of the shaft seats the plug valve member because of the action of crank or eccentric 27 against the follower surface 26.

In Fig. 3, the plug valve member 7 is shown off its seat, however, the clearance between the plug and its seat is not drawn to exact scale, but this showing is for purposes of illustration only.

During all of this operation of the plug valve member, it will be subjected to the line pressure from all sides so as to balance the forces against it due to line pressure. Also, all of the connection means between the shaft 9 and the plug valve member will be exposed to the interior of the casing. The only part of the actuating mechanism which is subjected to a pressure differential is the shaft 9 and the end thrust on this shaft is utilized, together with the friction engagement of packing 34 with the shaft, to prevent accidental rotation of the shaft and to maintain it in any selected position to which it is turned.

The balance of pressure across the plug valve member is even maintained when the plug valve member is in seated position because a passage communicates between the upper and lower portions of the interior of the casing. The key 40, which is seated in a recess in the body 5, engages the groove 20 to prevent any undesired rotation of the seat insert but does not seal off the groove 20.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A plug valve comprising a fluid tight valve casing with a flow passage therethrough and a valve seat transverse the passage, a plug valve member disposed within the casing for rotation and endwise movement on a common axis and cooperable with the seat to control the passage, an actuating shaft journaled in the casing with one end exterior thereof and the other end extending into the casing, said shaft disposed angularly relative to the rotational axis of the plug valve member, means sealing the journal, and power conversion connection means within the casing between the plug valve member and shaft for lifting the plug valve member from its seat, rotating it, and reseating it upon rotation of the shaft, said connection means including interengaging surfaces carried respectively by the shaft and plug valve member causing said lifting and reseating and disposed relative to each other to permit the plug valve member, during its initial endwise movement from and its final endwise movement to seated position, to move laterally within the confines of said seat, said plug valve member being free from connections with said casing, other than said connection means and seat, determining its movement during said initial and endwise movements so that said plug valve member can be shifted laterally by the seat into seating alignment therewith.

2. A valve as in claim 1 wherein means are provided for equalizing the pressure above and below the plug valve member with the plug valve in seated position.

3. The valve of claim 2 wherein the actuating shaft extends at a right angle to the rotational axis of the plug valve member.

4. A plug valve comprising a valve casing with a flow passage therethrough and a valve seat transverse the passage, a free floating plug valve member disposed within the casing for rotation and endwise movement on a common axis and cooperable with the seat to control the passage, an actuating shaft journaled in the casing with one end exterior thereof and the other end extending into the casing, means sealing the journal, and means within the casing including crank and follower parts connecting one end of the plug valve member with said shaft to transmit forces to the plug valve member, upon rotation of the shaft, in a direction parallel to the rotational axis of the plug valve member and normal to and eccentric of the plug valve member rotational axis, both ends of the plug valve member terminating short of said casing, said crank and follower parts having co-acting surfaces disposed so that during initial movement of the plug valve member from and its final movement to seated position, the plug valve member is free to move laterally within the confines of said seat so that it can be shifted laterally by the seat into seating alignment therewith.

5. The valve of claim 4 with means providing equilization of pressure within the casing above and below the plug valve member at all times.

6. The valve of claim 4 wherein the seat is formed on a removable liner within the casing and a passage is provided between the liner and casing communicating with the interior of the casing both above and below the plug valve member and liner, and wherein the casing includes a removable bonnet, said bonnet abutting an end of said liner to secure the latter against endwise movement toward the bonnet.

7. A plug valve comprising a fluid tight hollow valve casing provided with a flow passage made up of two parts releasably secured together, a tapered seat surface and cooperable plug valve member within the casing controlling the passage, said plug valve member being free to rotate about the axis of its taper and to move within limits endwise along this axis, actuating means for shifting the plug valve member endwise to seat and unseat it and to rotate it between open and closed rotational positions including a shaft extending angularly to the axis of the plug valve taper with a sealed journal in the casing and crank and follower parts within the casing connecting the shaft and plug valve member providing, with the seat surface, the sole restraint on movement of the plug valve member relative to the casing and permitting the plug valve member to be shifted laterally by the seat into seating alignment therewith.

8. A plug valve comprising a hollow valve casing provided with a flow passage made up of two parts releasably secured together, a tapered seat surface and cooperable plug valve member within the casing controlling the passage, said plug valve member being free to rotate about the axis of its taper and to move within limits endwise along this axis, a shaft extending angularly to the axis of the seat and plug valve member taper with a sealed journal in the casing and power conversion connection means within the casing between the plug valve member and shaft for unseating the plug valve member, rotating it, and reseating it upon rotation of the shaft, said plug valve member having its ends terminating short of said casing and being free to move laterally, when unseated, within the confines of said seat surface.

9. The valve of claim 8 wherein a passage communicates with the interior of the casing above and below the plug valve member to equalize the pressure thereacross.

10. A plug valve comprising a hollow casing with a flow passage therethrough, a seat and a cooperating plug valve member within the casing controlling flow through the passage, an actuating shaft with a sealed journal in the casing, said shaft extending at an angle to the axis of the plug valve member and seat, operable connection means within the casing between the plug valve member and shaft to provide for both rotative and endwise movement of the plug valve member on a common axis upon rotation of the shaft, said sealed journal including packing sealing between said shaft and casing, a thrust member abutting the innermost end of the packing and movable toward the packing, and a force transmitting connection between the shaft and thrust member for urging the thrust member to compress said packing upon endwise movement of the shaft responsive to fluid pressure internally of said casing.

11. A plug valve comprising a hollow casing with a flow passage therethrough, a tapered seat and a cooperating tapered plug valve member within the casing controlling flow through the passage, a shaft having a sealed journal in the casing at a right angle to the axis of the taper of the plug valve member, connection means within the casing between the shaft and plug valve member including crank means upon the shaft engageable with follower surfaces carried by the plug valve member normal to the axis of its taper, a crank extending angularly from the shaft, cam surfaces carried by the plug valve member substantially parallel to said taper axis and engageable by said angular crank throughout only the intermediate portion of the rotational cycle of the angular crank.

12. The valve of claim 11 wherein the crank means and angular crank act about 90° out of phase.

13. The valve of claim 11 wherein the cam surfaces and follower surfaces are formed integrally of the plug valve member.

14. A plug valve comprising a valve casing with a flow passage therethrough and a tapered valve seat transverse the passage, a free floating tapered plug valve member disposed within the casing for rotation and endwise movement and cooperable with the seat to control the passage, an actuating shaft journaled in the casing with one end exterior thereof and the other end extending into the casing, means sealing the journal, and power conversion connecting means within the casing between one end of the plug valve member and said shaft for lifting the plug valve member from its seat, rotating it, and reseating it upon rotation of the shaft, the other end of the plug valve member terminating short of the casing portion opposite thereto so that such other end, with the plug valve member lifted from its seat, is free to move laterally within the confines of said seat.

References Cited in the file of this patent

UNITED STATES PATENTS

| 1,352,423 | Arbon | Sept. 14, 1920 |
| 2,043,863 | Nordstrom | June 9, 1936 |
| 2,064,765 | Powell | Dec. 15, 1936 |
| 2,383,549 | Hilker | Aug. 28, 1945 |
| 2,459,682 | Carrie | Jan. 18, 1949 |

FOREIGN PATENTS

| 447,554 | Great Britain | May 21, 1936 |
| 518,583 | Great Britain | 1940 |